(12) United States Patent
Christie

(10) Patent No.: US 11,850,785 B2
(45) Date of Patent: Dec. 26, 2023

(54) POLYMER EXTRUDED, EXTRUSION METHOD, AND EXTRUDED MATERIAL

(71) Applicant: SAM North America, LLC, Phoenix, NY (US)

(72) Inventor: Andrew Christie, Fulton, NY (US)

(73) Assignee: SAM North America, LLC, Phoenix, NY (US)

( * ) Notice: Subject to any disclaimer, the term of this patent is extended or adjusted under 35 U.S.C. 154(b) by 0 days.

(21) Appl. No.: 17/501,959

(22) Filed: Oct. 14, 2021

(65) Prior Publication Data
US 2022/0111573 A1    Apr. 14, 2022

Related U.S. Application Data

(60) Provisional application No. 63/091,624, filed on Oct. 14, 2020.

(51) Int. Cl.
*B29C 48/30* (2019.01)
*C08L 23/06* (2006.01)
*B29C 48/21* (2019.01)
*B29C 48/46* (2019.01)
*B29C 48/305* (2019.01)
*B29C 48/08* (2019.01)
(Continued)

(52) U.S. Cl.
CPC ............ *B29C 48/304* (2019.02); *B29C 48/08* (2019.02); *B29C 48/21* (2019.02); *B29C 48/307* (2019.02); *B29C 48/46* (2019.02); *C08L 23/06* (2013.01); *B29K 2023/0633* (2013.01); *B29K 2067/046* (2013.01); *C08L 2201/06* (2013.01); *C08L 2205/025* (2013.01); *C08L 2205/03* (2013.01); *C08L 2207/066* (2013.01)

(58) Field of Classification Search
None
See application file for complete search history.

(56) References Cited

U.S. PATENT DOCUMENTS 4,069,092 A    1/1978  Zink et al.
4,348,346 A    9/1982  Thompson
(Continued)

FOREIGN PATENT DOCUMENTS

WO    WO1996040031    12/1996

OTHER PUBLICATIONS

Corbion, Processing Guide Extrusion paperboard coating with PLA, PLA Extrusion coating, 2020, 4 pages.
(Continued)

*Primary Examiner* — Robert J Grun
(74) *Attorney, Agent, or Firm* — Stites & Harbison PLLC; Richard S. Myers, Jr.; Patrick M. Torre

(57) ABSTRACT

An extruder system for rapid change between different melt strength polymers is provided. The extruder system includes at least three polymer extruders; a flow spool; and a multilayer feedblock including a first combining zone, a second combining zone, and at least one cartridge insert arrangement in each of the first combining zone and the second combining zone; where each cartridge insert arrangement is configured to receive a cartridge insert, the cartridge insert directing flow of a polymer from one of the polymer extruders. Also provided are method of forming an encapsulated coating with the extruder system and an encapsulate coating formed with the extruder system.

19 Claims, 13 Drawing Sheets

(51) Int. Cl.
B29K 67/00 (2006.01)
B29K 23/00 (2006.01)

(56) References Cited

U.S. PATENT DOCUMENTS

| | | |
|---|---|---|
| 6,645,584 B1 | 11/2003 | Kuusipalo et al. |
| 7,854,994 B2 | 12/2010 | Henderson-Rutgers et al. |
| 8,980,964 B2 | 3/2015 | Topolkaraev et al. |
| 9,040,120 B2 | 5/2015 | Hunt et al. |
| 9,162,421 B2 | 10/2015 | Mount et al. |
| 9,248,947 B2 | 2/2016 | Georgelos et al. |
| 9,267,011 B2 | 2/2016 | Cotton et al. |
| 9,844,797 B2 | 12/2017 | Skupin et al. |
| 10,167,594 B2 | 1/2019 | Nevalainen et al. |
| 2013/0340673 A1 | 12/2013 | Godfroid et al. |
| 2014/0099502 A1 | 4/2014 | Nevalainen et al. |
| 2018/0207917 A1 | 7/2018 | Patel |
| 2019/0134905 A1* | 5/2019 | Mire .................... B33Y 40/00 |

OTHER PUBLICATIONS

Rastogi, et al., Bio-Based Coatings for Paper Applications, Coatings 2015, 5, 887-930.

* cited by examiner

RUN DATA

TEMPERATURE COMPARISONS

RUN DATA

FIG. 14A

TEMPERATURE COMPARISONS

FIG. 14B

POLYMER EXTRUDED, EXTRUSION METHOD, AND EXTRUDED MATERIAL

RELATED APPLICATIONS

This application claims the benefit of U.S. Provisional Application Ser. No. 63/091,624, filed Oct. 14, 2020, the entire disclosure of which is incorporated herein by this reference.

TECHNICAL FIELD

The present disclosure is directed to a polymer extruder, method of extruding polymers, and articles produced therefrom. In particular, the disclosure is directed to a polymer extruder including edge encapsulation vane inserts, an extrusion method using the edge encapsulation vane inserts to stabilize low melt strength polymer, and extruded articles formed therefrom.

BACKGROUND

Bio-based polymers are a type of polymer obtained from renewable resources. These polymers provide various benefits as compared to other types of polymers, such as a low carbon footprint, being bio-degradable (in an industrial compost environment), and being repulpable. Due to these benefits, there are many different applications where the use of bio-based polymers would be advantageous. One area of particular interest is packaging, including single use paper coatings (e.g., paper cups, paper plates, and trays).

Currently, these products are coated with low-density polyethylene (LDPE), possibly in combination with small amounts of polypropylene (PP) or high-density polyethylene (HDPE), and are typically extruded as a single monolithic layer through a single manifold die. Such coatings may alternately include a barrier coating structure similar to that shown in FIG. 1. These barrier coatings including LDPE are typically formed using single manifold dies with coextrusion equipment, such as the extruder feedblock shown in FIG. 2. These machines run at high speeds (e.g., 1200 to 2000 fpm) and elevated processing temperatures (e.g., 620° F. for LDPE). While attempts have been made to run many different bio-polymers through these machines in place of LDPE, bio-based polymers have very low melt strength, and thus require very low processing temperatures (i.e., <480° F.). As such, an extruder set up to run LDPE can typically only run a bio-polymer at 20 to 40% of the output of LDPE before it starts to overheat. Overheating causes a loss of melt strength and results in speed limited extrusion. For example, an extruder that runs LDPE at 1600 fpm is often stuck running bio-polymers at <400 fpm.

One option for addressing the overheating and resulting speed limited extrusion includes the use of specially modified bio-polymers. These modified bio-polymers come at a significant cost premium and may only allow an increase in speed of up to about 600 fpm. Another option includes changing out the feedscrew to lower the melt temperature, which may provide another couple hundred fpm (e.g., up to about 900 fpm). However, for most operations a screw change is a one shift process and as the growing market for bio-polymer coatings is still very small, the converter needs to be able to switch back and forth between LDPE and bio-polymer. Together, the premium for modified bio-polymers, the time required for a screw change, and the resulting speed still being well below the speed of LDPE coating make bio-based polymer products prohibitively expensive.

Accordingly, there is a need for articles and methods that permit faster switching between LDPE and bio-based polymers as well as running of bio-based polymers at increased speeds.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

In some embodiments, the presently-disclosed subject matter includes an extruder system for rapid change between different melt strength polymers, the system including at least three polymer extruders; a flow spool; and a multilayer feedblock including a first combining zone, a second combining zone, and at least one cartridge insert arrangement in each of the first combining zone and the second combining zone; wherein each cartridge insert arrangement is configured to receive a cartridge insert, the cartridge insert directing flow of a polymer from one of the polymer extruders. In some embodiments, each of the cartridge inserts is independently selected from the group consisting of a vane insert and an encapsulation insert. In some embodiments, each cartridge insert arrangement in the first combining zone includes a vane insert positioned therein. In some embodiments, each cartridge insert arrangement in the second combining zone includes a vane insert. In some embodiments, each cartridge insert arrangement in the second combining zone includes an encapsulation insert. In some embodiments, the first combining zone includes at least three flow channels, each flow channel receiving polymer flow one or more of the at least three polymer extruders. In some embodiments, the second combining zone includes a center flow channel and at least two outer flow channels, wherein the center flow channel receives polymer flow from the first combining zone, and wherein the at least two outer flow channels receive polymer flow from one or more of the at least three polymer extruders. In some embodiments, each of the outer flow channels is directed through one of the cartridge inserts. In some embodiments, each of the cartridge inserts is a vane insert and the extruder system forms stacked polymer flows. In some embodiments, each of the cartridge inserts is an encapsulation insert and the extruder system form encapsulated edge flows.

Also provided herein, in some embodiments, is a method of forming an encapsulated coating with the extruder system disclosed herein, the method including extruding a first polymer through a first extruder, extruding a second polymer through a second extruder, extruding a third polymer through a third extruder, forming a full width core layer from the first polymer, passing the second polymer through vane inserts in the first combining zone to form two full width outer layers, combining the full width core layer with the two full width outer layers in the first combining zone to form a central portion, passing the third polymer through edge encapsulation inserts in the second combining zone to form edge encapsulation layers, and combining the central portion with the edge encapsulation layers in the second combining zone to form the encapsulated coating.

In some embodiments, the third polymer is a high melt strength polymer. In some embodiments, the high melt strength edge encapsulation layers provide increased production speeds. In some embodiments, the coating is a conventional extrusion coating where the first polymer is extruded from an extruder configured for low shear and low temperature processing (LT-E), the second polymer is extruded from an extruder configured for higher shear and high temperature processing (HT-E), the third polymer is extruded from an extruder configured for edge encapsulation (EE-E), and the second polymer extruded from the HT-E extruder forms a hot skin layer that provides an improved oxidation bond. In some embodiments, the first polymer is an extrusion coating grade low density polyethylene (LDPE), the second polymer is an extrusion coating grade LDPE, and the third polymer is a high melt strength autoclave LDPE.

In some embodiments, the coating is a bio-based or bio-degradable extrusion coating, the first polymer is extruded from an extruder configured for higher shear and high temperature processing (HT-E), the second polymer is extruded from an extruder configured for low shear and low temperature processing (LT-E), the third polymer is extruded from an extruder configured for edge encapsulation (EE-E), and the second polymer extruded from the LT-E extruder forms a cold skin layer that provides an improved melt strength in processing. In some embodiments, the high melt strength polymer is low density polyethylene. In some embodiments, the first polymer is a bio-based bio-degradable polymer, the second polymer is a bio-based bio-degradable polymer, and the third polymer is a high melt strength autoclave LDPE. In some embodiments, the first polymer and the second polymer are PLA.

Further provided herein, in some embodiments, is an encapsulated coating formed with the extruder system disclosed herein, the encapsulated coating including a central portion including at least one full width core layer, a full width outer layer on a top side of the at least one full width core layer, and a full width outer layer on a bottom side of the at least one full width core layer; and two edge encapsulation layers, one on either side of the central portion.

Further features and advantages of the presently-disclosed subject matter will become evident to those of ordinary skill in the art after a study of the description, figures, and non-limiting examples in this document.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIGS. 14A-B show tables illustrating data from multiple runs with PLA. (A) Run data. (B) Temperature Comparisons.

Figure 1:
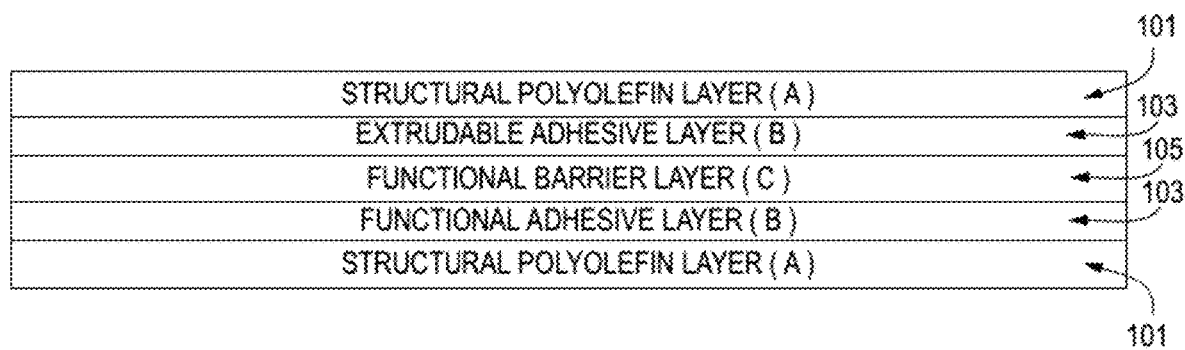
FIG. 1 shows an image of a common five layer barrier coating produced by a three extruder system.
Figure 2:
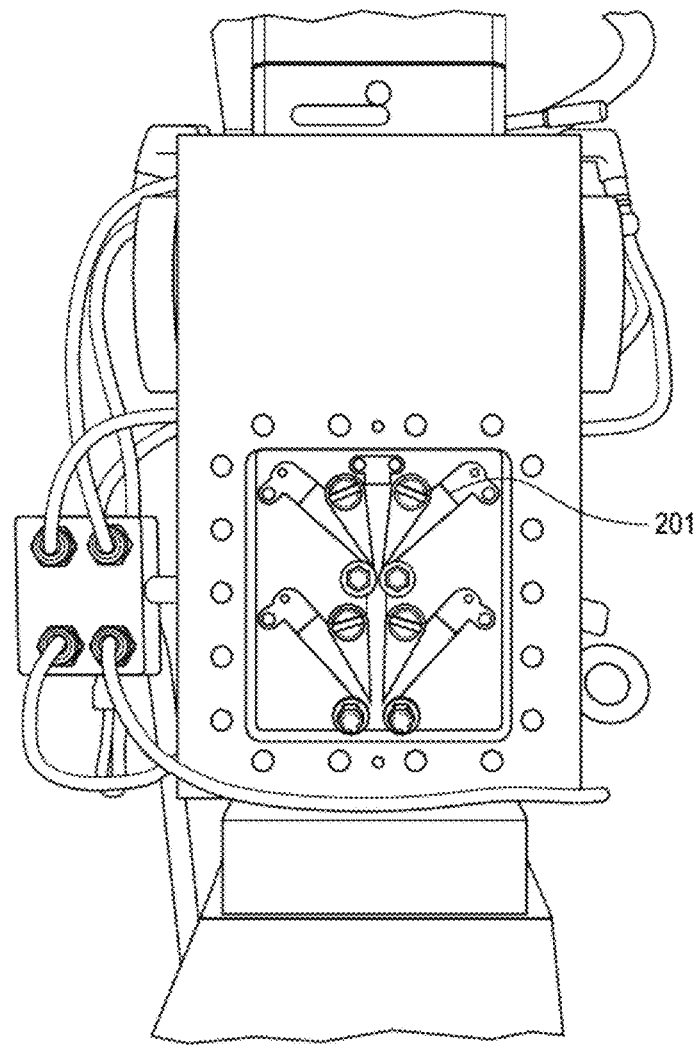
FIG. 2 shows an image of an extruder feedblock configured for five layer coatings with the cover removed.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

Definitions

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

All combinations of method or process steps as used herein can be performed in any order, unless otherwise specified or clearly implied to the contrary by the context in which the referenced combination is made.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Figure 3:
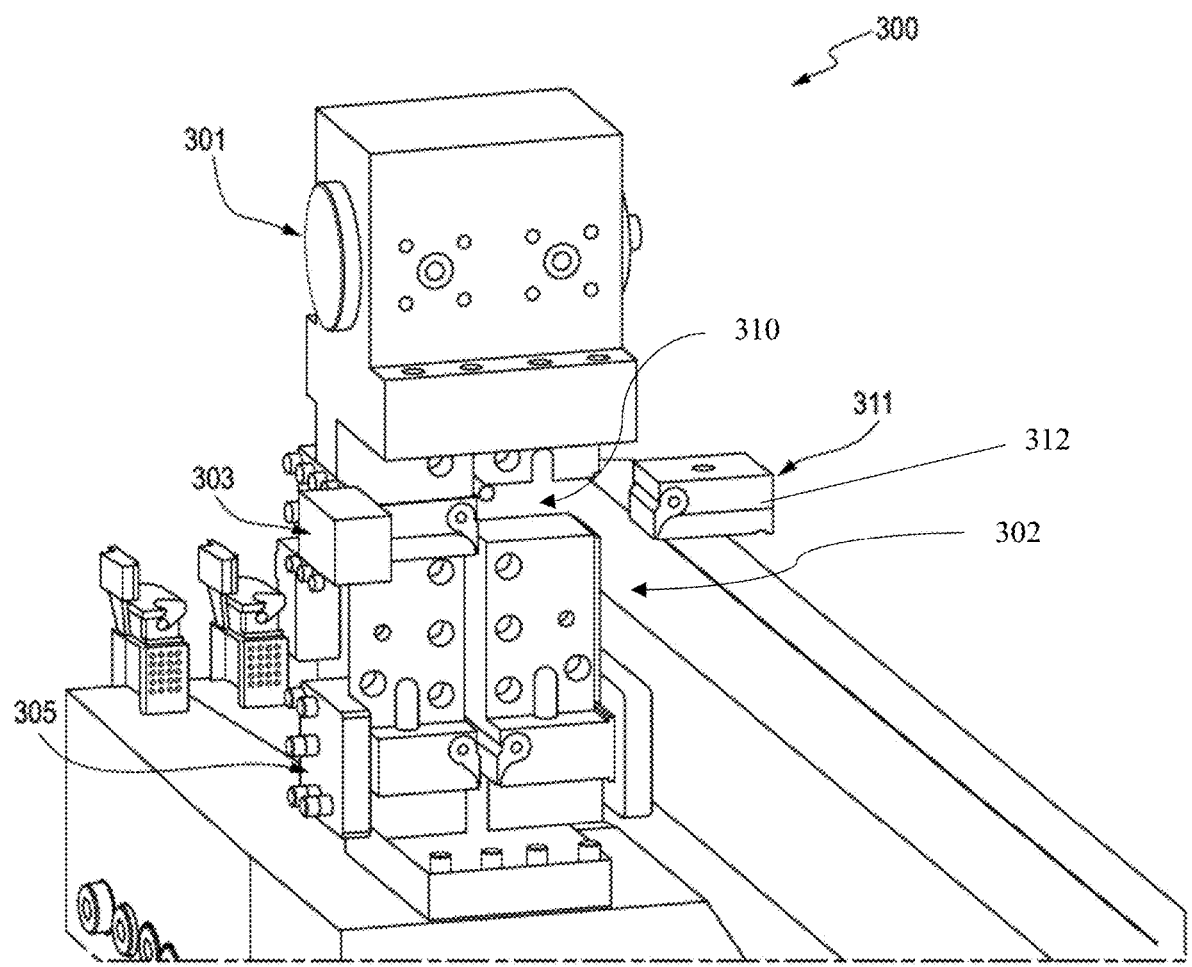
FIG. 3 shows an image of an alternate feedblock design with vane inserts.

Provided herein, in some embodiments, is an extruder system for forming edge encapsulated polymer structures including at least one bio-based polymer (biopolymer). Referring to FIG. 3, in some embodiments, the extruder system 300 includes an arrangement flow spool 301 and a feedblock 302, the feedblock 302 including a cartridge insert arrangement 310, a first combining zone 303, and a second combining zone 305. In some embodiments, the feedblock 302 includes at least one cartridge insert arrangement 310 in each of the first combining zone 303 and the second combining zone 305. In some embodiments, the feedblock 302 includes two cartridge insert arrangements 310 in each of the combining zones 303,305. Each cartridge insert arrangement 310 is configured to receive a cartridge insert 311 therein. The arrangement flow spool 301 receives any suitable number of polymer inputs and distributes them to the combining zones 303,305 and/or cartridge inserts 311 within the combining zones 303,305. Suitable numbers of polymer inputs include, but are not limited to, 2, 3, 4, 5, 6, 7, 8, or more individual polymer inputs. In some embodiments, each polymer input is received from a different extruder. Additionally or alternatively, in some embodiments, at least one of the polymer inputs is split into two or more polymer flows before being distributed to the combining zones 303,305.

Figure 4:
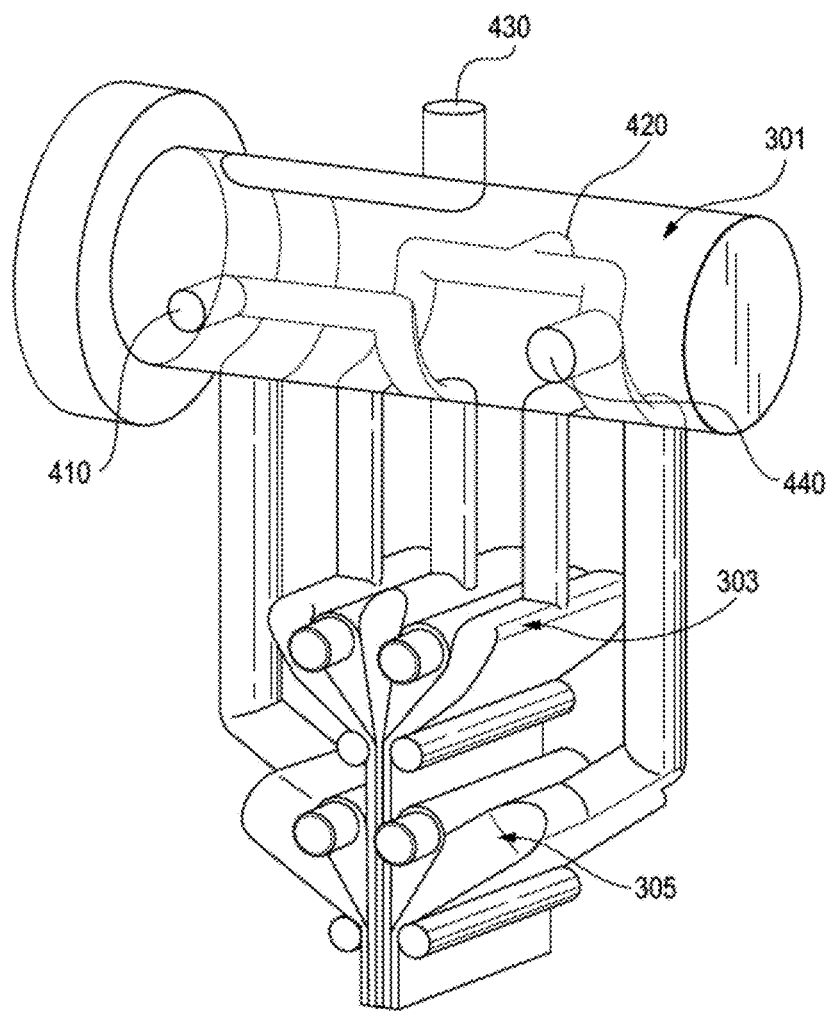
FIG. 4 shows an image of polymer flows in typical five layer feedblock.

For example, in one embodiment, as illustrated in FIG. 4, the flow spool 301 may receive polymer inputs 410,420, 430,440 from four different extruders, with one of the inputs 420 being split into two separate flows in order to form a 5 layer barrier coating. In another embodiment, the flow spool 301 may receive polymer inputs (e.g., 410, 420, and 430) from three different extruders, with two of the inputs (e.g., 420 and 430) each being split into two separate flows in order to form a 5 layer barrier coating (e.g., 430 being split to form the layers of 430 and 440 in the four input system of FIG. 4). In such embodiments, the coating is formed through feedblock coextrusion, where the polymer input 410 from extruder C and the split polymer input 420 from extruder B are combined in the first combining zone 303 (B-C-B), which is then combined with the split polymer input 430 from extruder A in the second combining zone (A-(B-C-B)-A), all polymer inputs being combined as full width layers. Although described herein primarily with respect to three extruder systems with two inputs being split, the disclosure is not so limited and may include any other suitable number of extruders and splits.

Figure 5:
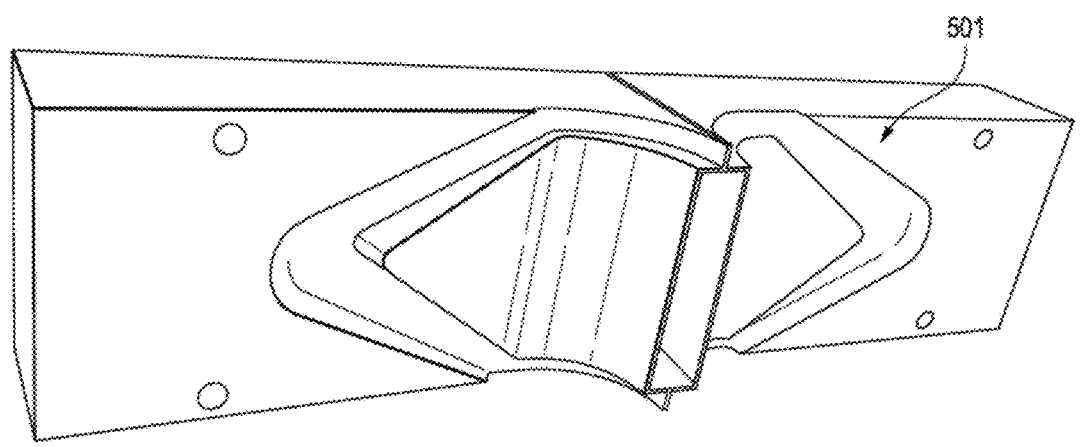
FIG. 5 shows an image of encapsulation inserts (used in the feedblock to provide a lane of flow to each edge which feeds into the single manifold die).
Figure 6:
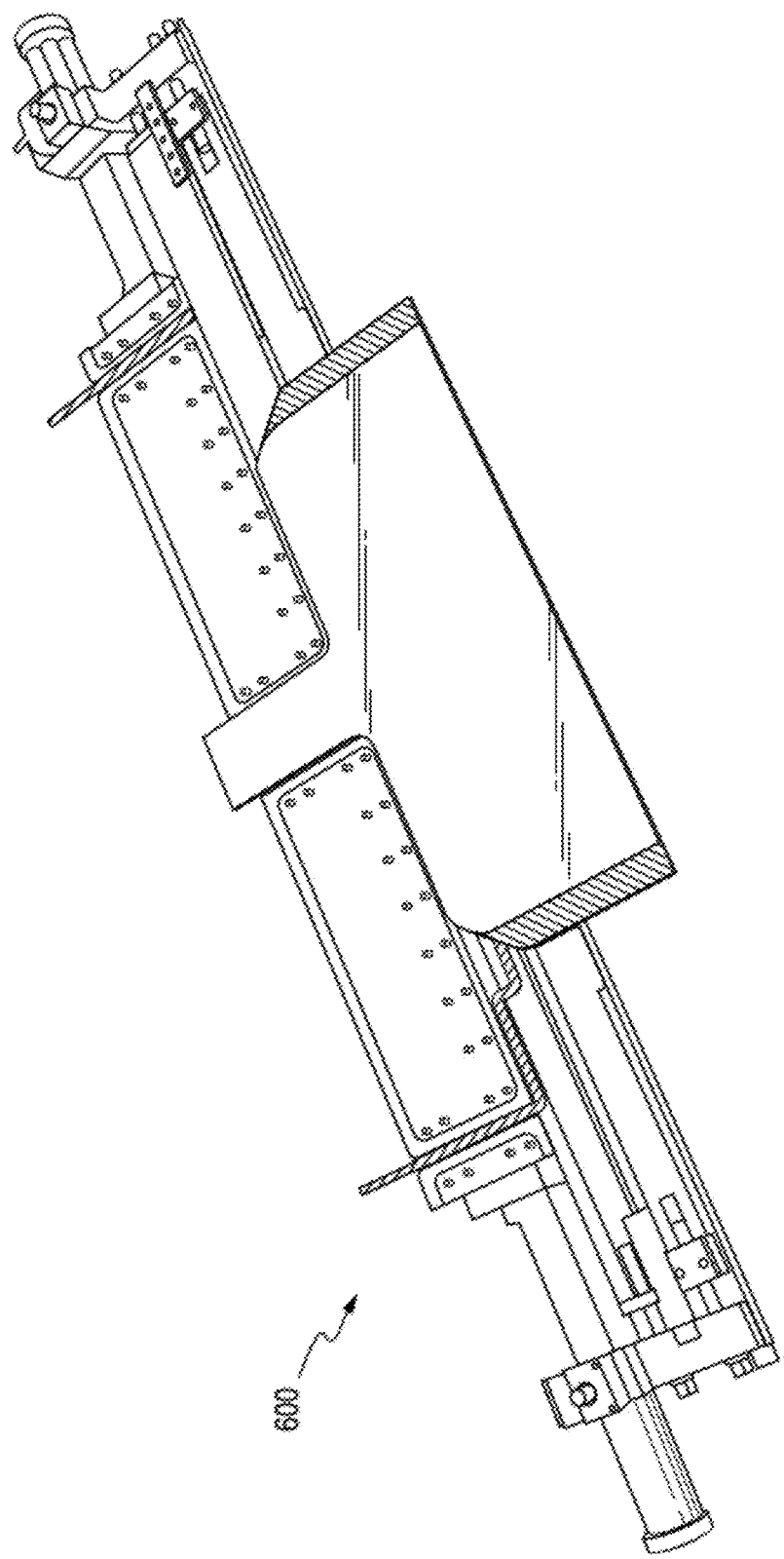
FIG. 6 shows an image of a single manifold die with an edge encapsulation flow channel through the die for low melt strength polymers.
Figure 7A:
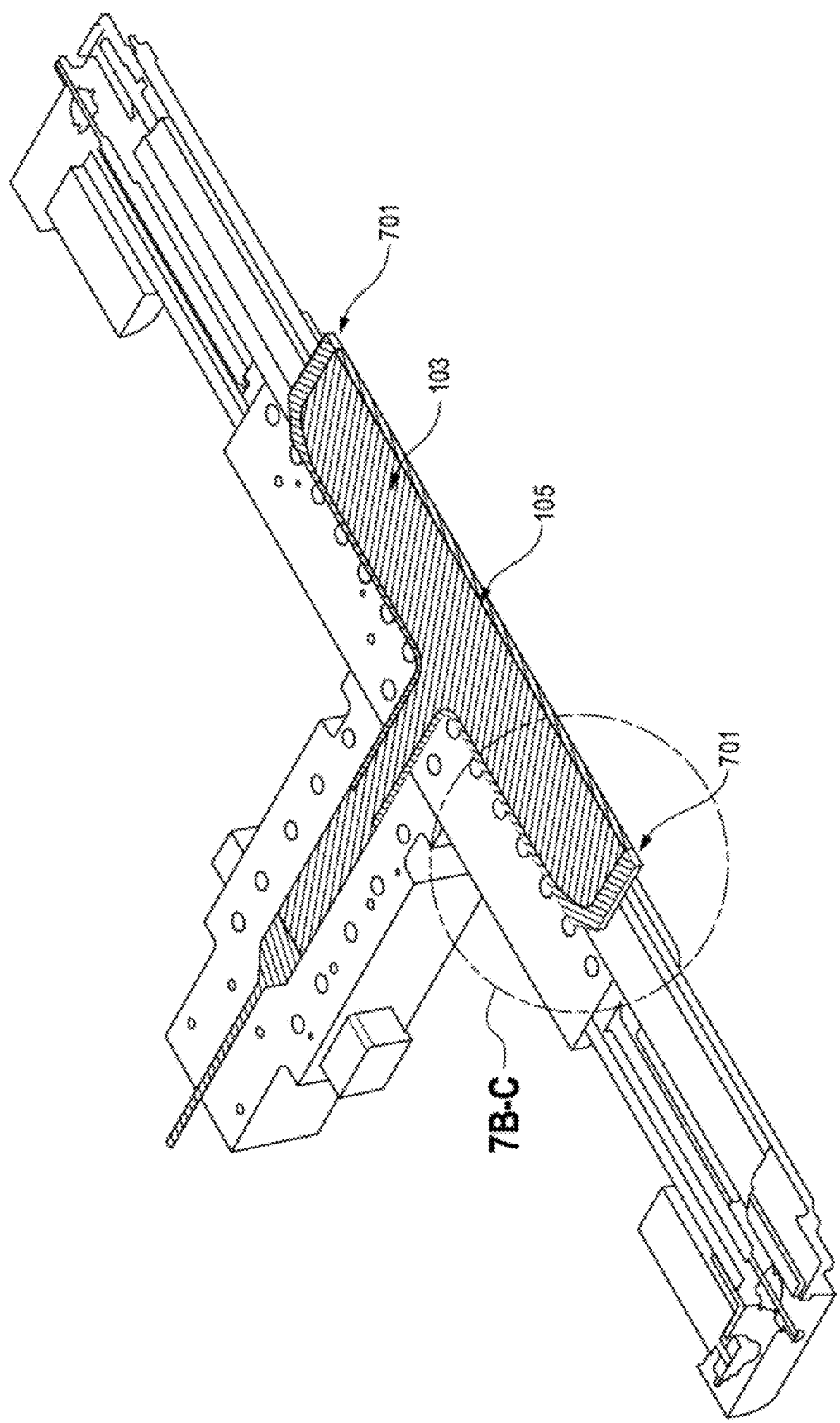
FIGS. 7A-C show images of the polymer flow through the feedblock and single manifold die with the encapsulation inserts in place. (A) Perspective view of feedblock flow with encapsulation inserts in place. (B) Enlarged sectional perspective view showing the cross-sectional arrangement of the polymer layers at the exit of the single manifold die with encapsulation inserts in place. (C) Enlarged front view showing position of encapsulation layer polymer flow path from the feedblock through the single manifold die with encapsulation inserts in place.
Figure 7B:
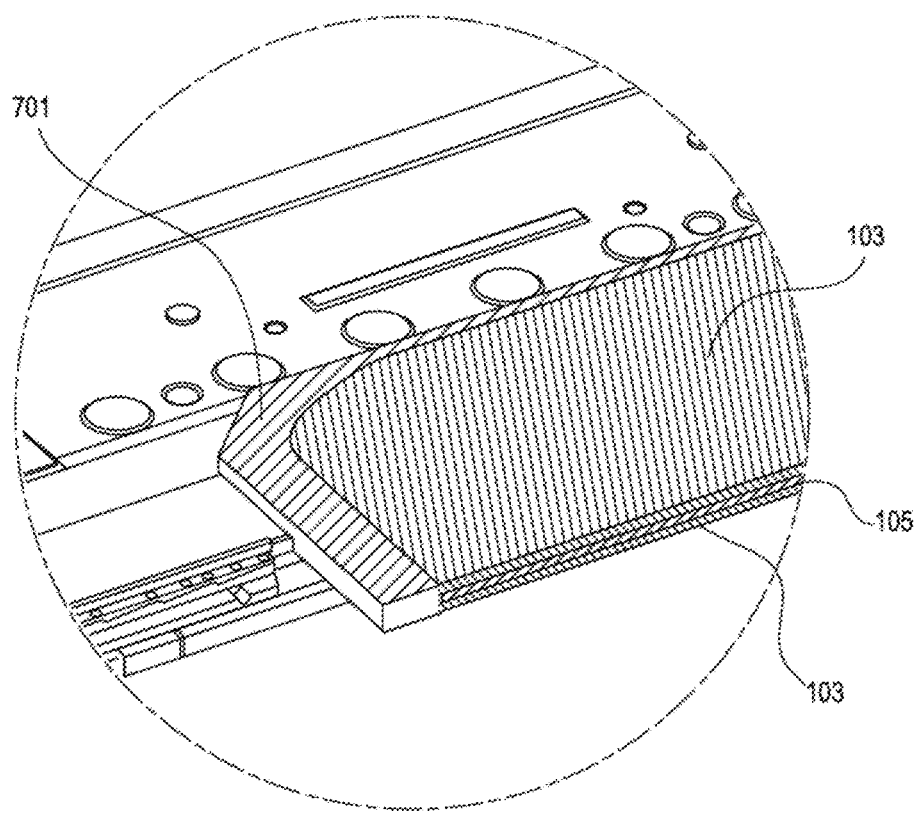
Figure 7C:
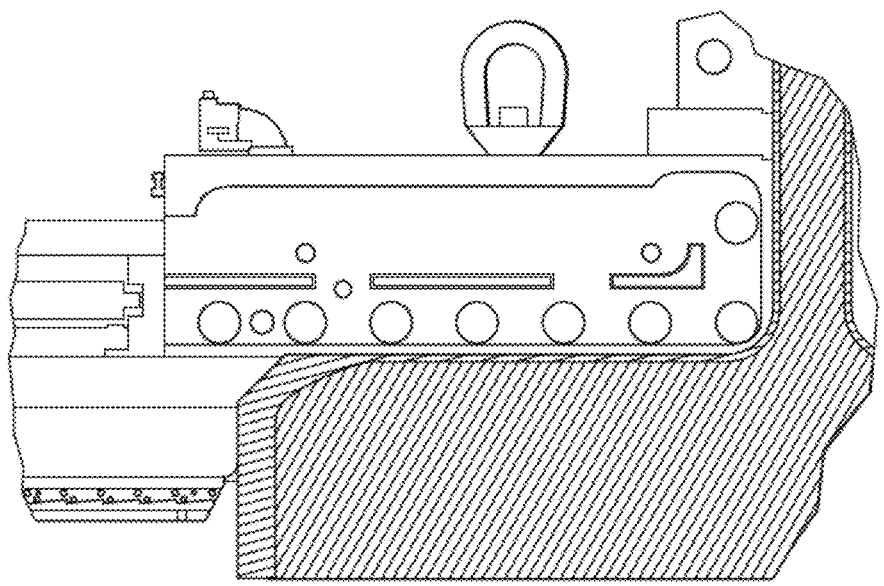
Figure 8:
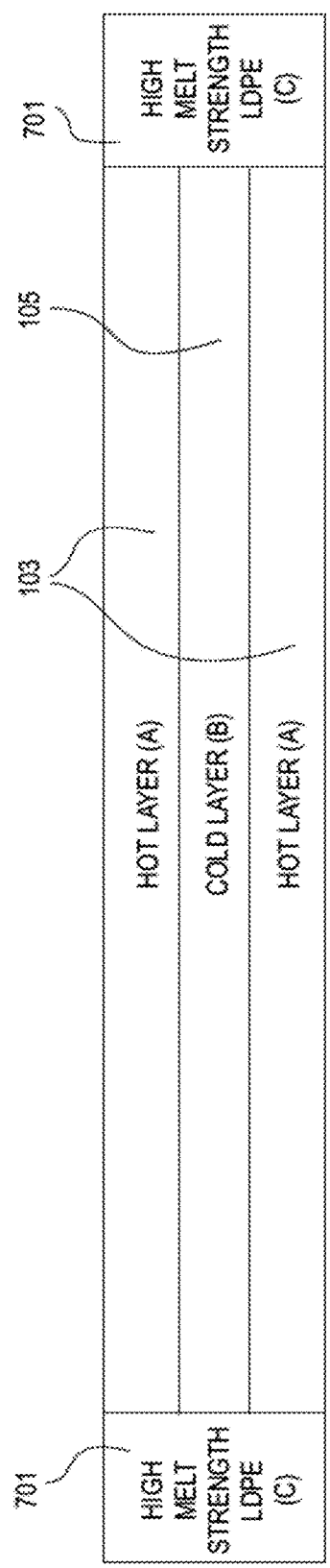
FIG. 8 shows an image of a CABAC edge encapsulated coating produced by a three extruder system with encapsulation inserts according to an embodiment disclosed herein.
Figure 9:
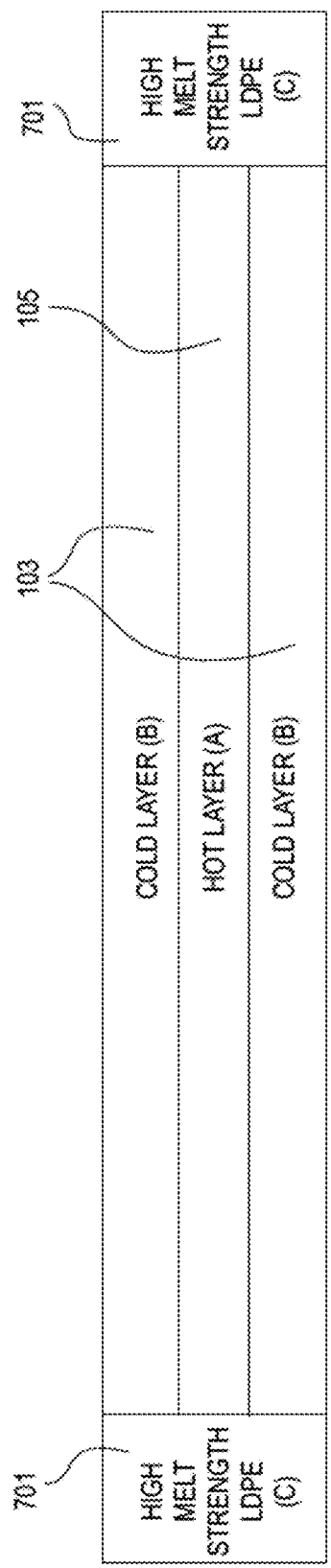
FIG. 9 shows an image of a CBABC edge encapsulated coating produced by a three extruder system with encapsulation inserts according to an embodiment disclosed herein.

Turning to FIG. 5, in some embodiments, at least one of the cartridge inserts 311 in the second combining zone 305 includes an encapsulation insert 501 in place of a vane insert 312. The encapsulation inserts 501 includes an input portion and an output portion. The input portion includes an opening having any suitable shape and size for receiving a polymer flow from the extruder and/or arrangement flow spool 301. The output portion includes a split channel that is arranged and disposed to convert the polymer into edge(s) 701 instead of the full width layer 101 provided by the vane inserts 312 when present in the second combining zone 305 (FIGS. 7A-C). For example, in some embodiments, the first combining zone 303 includes two vane inserts 312, with each vane insert 312 arranged and disposed to provide a full width layer 103 on opposite sides of a full width core layer 105, and the second combining zone 305 includes two encapsulation inserts 501 which together form side-by-side edges 701 on either side of the full width layers 103,105. In other words, the encapsulation inserts 501 convert a five (5) layer structure (e.g., FIG. 1) into a three (3) layer structure with encapsulated edges (FIGS. 8-9). Additionally or alternatively, the feedblock may include a die designed for encapsulation through die arrangement pins, such as the die 600 shown in FIG. 6, to form the side-by-side edges 701.

As will be appreciated by those skilled in the art, when converting a five (5) layer structure into a three (3) layer structure it may be desirable to change the material of one or more layers. For example, while the full width layer 103 is an inner adhesive layer in the five (5) layer structure of FIG. 1, it becomes an outer hot or cold layer in the three (3) layer structures of FIGS. 8-9. In view thereof, full width layers 103, the full width core layer 105, and the edges 701 include any suitable polymer or combination of polymers. For example, in some embodiments, the edges 701 include a high melt strength polymer. Suitable high melt strength polymers include, but are not limited to, low-density polyethylene (LDPE). In some embodiments, as illustrated in FIG. 8, the full width core layer 105 and the full width layers 103 all include a high melt strength polymer (e.g., LDPE), with the full width layers 103 forming hot layers extruded from a hot extruder (about 620° F.) and the full width core layer 105 forming a cold layer extruded from a cold extruder (<450° F.). In such embodiments, processing some of the polymer at a lower temperature unexpectedly provides more balanced properties, resulting in improved heat seal characteristics. Alternatively, in some embodiments, as illustrated in FIG. 9, the full width core layer 105 and the full width layers 103 all include a biopolymer, with the full width layers 103 forming cold layers extruded from a cold extruder and the full width core layer 105 forming a hot layer extruded from a hot extruder.

Figure 10:
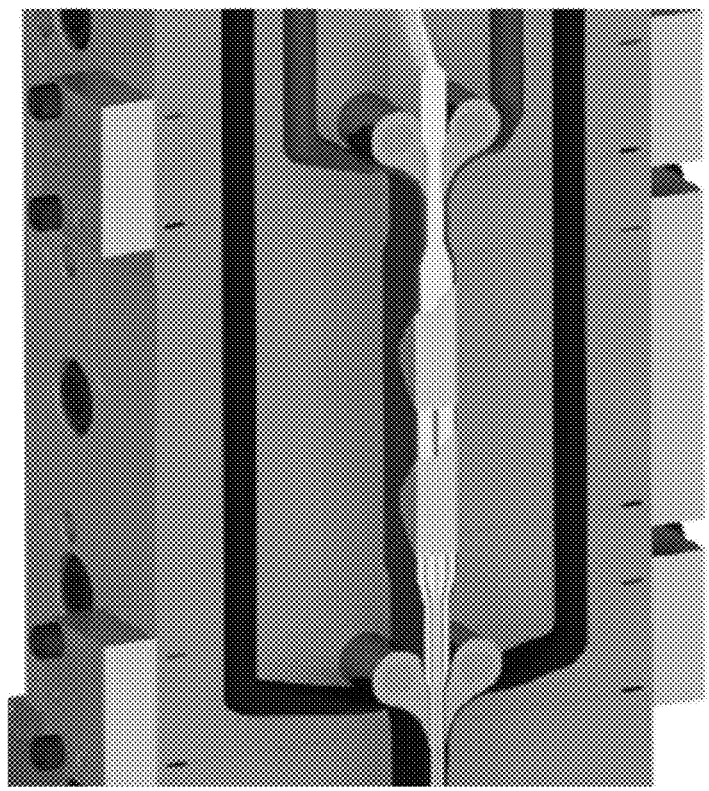
FIG. 10 shows an image of a five layer feedblock with layer multiplier technology (LMT).
Figure 11:
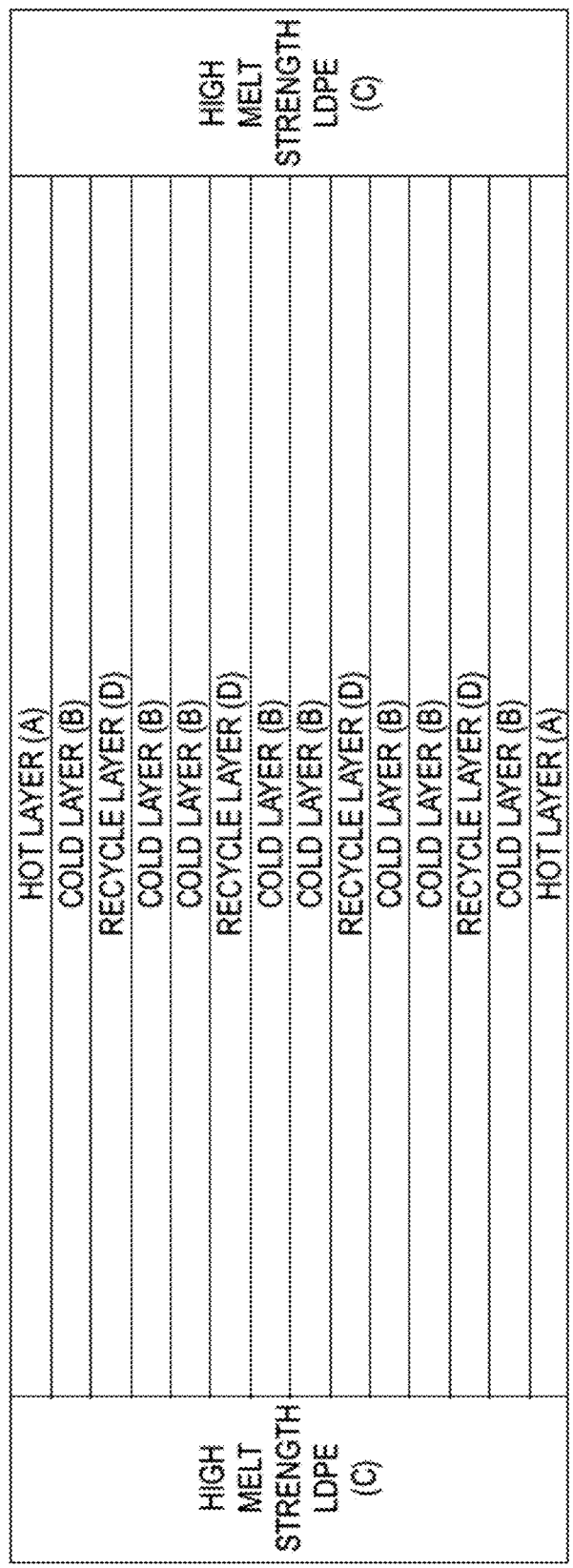
FIG. 11 shows an image of an edge encapsulated coating produced by an extruder system with LMT and encapsulation inserts according to an embodiment disclosed herein.

Additionally, although discussed herein primarily with respect to coatings having three central layers 103, 105 with edge encapsulation layers 701 on either side, this disclosure is not so limited and may include any other suitable structure. Other suitable structures include, but are not limited to, an edge encapsulation layer 701 on only one side, additional edge encapsulation layers 701, different edge encapsulation layers 701 on either side, different full width layers 103 on either side of the full width core layer 105, additional full width core layers 105, any other suitable variation in layers, or a combination thereof. For example, in some embodiments, the full width layers 103 and the full width core layer 105 include more than three layers. In one embodiment, the additional layer(s) are formed by additional extruders. Additionally or alternatively, in another embodiment, the feedblock includes layer multiplier technology (LMT) (FIG. 10) that is capable of further splitting the polymer inputs (e.g., more than five layers with a five layer feedblock). Referring to FIG. 11, for example, the central portion of the coating may include at least one hot layer on either side of a core portion including multiple blocks, each block having one or more sections of a recycle layer between two cold layers. In such embodiments, the hot layer (or skin) provides the bond while the cold core provides strength, with an additional extruder adding recycle material between cold (strength) layers. Without wishing to be bound by theory, it is believed that the application of LMT provides improved distribution and reinforces the strengthening effects of the cold layers.

As will be appreciated by those skilled in the art, the encapsulation inserts 501 and/or the die 600 may be used in combination with a variety of system configurations. One such configuration includes a 5 layer insert style feedblock with encapsulation inserts 501 in the second combining zone 305 and arrangement pins for conventional high speed 5 layer coating with corresponding extruder screws. Another configuration includes a 5 layer vane or insert style feedblock with a die 600 designed for encapsulation through die arrangement pins for conventional high speed 5 layer coating with corresponding extruder screws. Another configuration includes a 3 layer vane or insert style feedblock with a die 600 designed for encapsulation through die arrangement pins for high speed coating with corresponding extruder screws. Another configuration includes a 5 layer insert style feedblock with encapsulation inserts 501 in the second combining zone 305, layer multiplier technology (LMT), and arrangement pins for conventional high speed 5 layer coating with corresponding extruder screws. Another configuration includes a 5 layer insert style feedblock with encapsulation inserts 501 in the second combining zone 305, layer multiplier technology (LMT), arrangement pins for conventional high speed 5 layer coating with corresponding extruder screws, and an additional extruder for recycle processing to LMT.

Also provided herein is a method of forming an encapsulated coating. In some embodiments, the method includes forming a coating with high melt strength polymer such as LDPE. Such methods include first providing the extruder system 300 with the encapsulation inserts 501 or die 600 according to one or more of the embodiments disclosed herein. Since the encapsulation inserts 501 and/or die 600 are retrofittable into existing systems, this step may include simply inserting the encapsulation inserts 501 and/or die 600 as discussed herein. Next, the method includes extruding the high melt strength polymer through a medium shear extruder, extruding the high melt strength polymer through a high shear (hot) extruder at a high temperature (about 620° F.), and extruding the high melt strength polymer through a low shear (cold) extruder at a lower temperature (<450° F.). The polymer extruded through the high shear extruder, which forms the full width layers 103, and the polymer extruded through the low shear extruder, which forms the full width core layer 105, are then combined in the first combining zone 303 to form a central portion. This central portion is then combined with the polymer extruded through the medium shear extruder, which forms the edges 701, to form the encapsulated coating. Without wishing to be bound by theory, it is believed that the hot outer portions provide a bond to the substrate and/or the cool core improves heat seal strength through reduced degradation of the bulk of the polymer.

Additionally or alternatively, in some embodiments, the method includes forming a coating with a biopolymer. As used herein, the terms "biopolymer" and "bio-based polymer" are used interchangeably to refer to polymers that are obtained from renewable resources such as algae, bacteria, microorganisms, plants (e.g., corn or sugarcane), or other suitable renewable raw materials. Such methods include first providing the extruder system 300 with the encapsulation inserts 501 or die 600 according to one or more of the embodiments disclosed herein. Since the encapsulation inserts 501 and/or die 600 are retrofittable into existing systems, this step may include simply inserting the encapsulation inserts 501 and/or die 600 as discussed herein. Next, the method includes extruding a high melt strength polymer through a first hot extruder at a high temperature (about 550° F.), extruding the biopolymer through a cold extruder at a lower temperature (<450° F.), and extruding the biopolymer through a second hot extruder at a high temperature (about 500° F.). The biopolymer extruded through the cold extruder, which forms the full width layers 103, and the polymer extruded through the second hot extruder, which forms the full width core layer 105, are then combined in the first combining zone 303 to form a central portion. This central portion is then combined with the polymer extruded through the first hot extruder, which forms the edges 701, to form the encapsulated coating.

Without wishing to be bound by theory, it is believed that the edges 701 stabilize the low melt strength biopolymers to facilitate high speed biopolymer extrusion, while the biopolymer extrusion at or below recommended processing temperatures in the cold extruder provides improved stability and properties. More specifically, while a higher polymer temperature may provide better bonding to the web, the bio-polymers start to degrade at higher temperatures, and when they degrade they lose strength in molten state. Additionally, at higher line speeds the rate of extension of the polymer being drawn from the die goes up and the melt curtain becomes very unstable. The only way to address these issues in existing methods is to slow down line speed (not productive) and/or lower the temperature (lose bond=no product). In contrast, the edge stabilization disclosed herein permits extrusion without or substantially without such slowing of line speed and/or lowering of the temperature. Accordingly, as compared to existing systems and methods, which require full feedscrew changes or decreased processing speeds, the systems and methods disclosed herein permit rapid changing between conventional extrusion coating polymers and bio-polymers or other very low melt strength polymers. For example, in one embodiment, the systems and methods disclosed herein permit rapid change between conventional extrusion coating polymers at processing temperatures about 315° C. and specialty bio-based and or bio-degradable polymers at processing temperatures less than 230° C. In another embodiment, the system includes at least one extruder configured for low shear and low temperature processing (LT-E), at least one extruder configured for higher shear and high temperature processing (HT-E), and at least one extruder for edge encapsulation (EE-E).

Once again, without wishing to be bound by theory, it is believed that with the high melt strength or traditional polymers, the high shear extruder provides high temperatures for oxidation bond to web substrates, while the moderate shear extruder provides adequate temperatures with minimum degradation. The low shear extruder, on the other hand, provides low temperatures and minimum degradation of the biopolymers. In some embodiments, the method may further include processing with post-consumer recycled (PCR) polymers. In some embodiments, a cold core of PCR enhances strength through reduced degradation. These benefits may be further enhanced through use of LMT and/or an additional extruder.

Although the methods described herein include extrusion of the full width core layer 105 at a temperature that is either hotter (e.g., PLA or other biopolymer) or colder (e.g., LDPE or other high melt strength polymer) than optimum, the overall structure permits production with biopolymers at high speeds. That is, in contrast to existing methods, the methods disclosed herein permit extrusion of biopolymers at high speed (e.g., at least 1000 fpm, at least 1200 fpm) without screw changes or specialty polymers. Additionally, the incorporation of the edge encapsulation into the feedblock facilitates each change-over between high melt strength polymers and biopolymers. For example, instead of the one shift screw changes of existing methods the methods disclosed herein permit change-over from high melt strength polymer to biopolymer through only resin (e.g., switch typical mono coating resin from 1 extruder into 2 extruders plus encapsulation extruder) and feedblock set up change, which typically takes less than an hour. On the other hand, the use of the same system with traditional (non-biopolymers) and/or high melt strength polymers improves the properties thereof.

Further provided herein are encapsulated coatings including the edges 701 discussed herein. In some embodiments, the coatings include high melt strength or traditional polymers in each of the full width layers 103, the full width core layer 105, and the edges 701. For example, in one embodiment, the coating includes LDPE in each of the full width layers 103, the full width core layer 105, and the edges 701. In another embodiment, the coating formed with hot full width layers 103 and a cold full width core layer 105 according to one or more of the embodiments disclosed herein provide an improved bond to the substrate and/or improved heat seal strength through reduced degradation of the bulk of the polymer. Alternatively, in some embodiments, the coatings include biopolymers in the full width layers 103 and the full width core layer 105, and high melt strength or traditional polymer in the edges 701. In one embodiment, the coating includes improved stability and properties, while the edges 701 stabilize the low melt strength biopolymers to facilitate high speed biopolymer extrusion.

Although discussed herein primarily with respect to coatings, and particularly barrier coatings, the disclosure is not so limited. For example, in some embodiments, as opposed to coated products, such as paper unwound from a roll and coated with molten polymer, the extruder system may be used to bond two or more webs together. In such embodiments, the technique may be applied as limination, where the extruded polymers are used as a 'glue' to bond two webs together. The webs may be the same type of material or different types of material, such as, but not limited to, paper to paper, paper to cellulose film, or any other suitable type or combination of web materials.

The presently-disclosed subject matter is further illustrated by the following specific but non-limiting examples. The following examples may include compilations of data that are representative of data gathered at various times during the course of development and experimentation related to the presently-disclosed subject matter. Those skilled in the art will recognize, or be able to ascertain, using no more than routine experimentation, numerous equivalents to the specific substances and procedures described herein.

EXAMPLES

This Example describes the running of conventional LDPE in a coating application at a production speed of 1800 fpm, which is a typical and viable commercial speed for LDPE, followed by running of straight PLA (Ingeo 1102 from NatureWorks) at 1200 fpm using the same equipment after only a resin change and a feedblock "selector pin" change. The 1200 fpm production speed for PLA is two times higher than most current production speeds for conventional extrusion coating equipment set ups. Additionally, in contrast to existing converters that require a change in extruder feedscrew in order to change from LDPE to PLA, which typically requires at least one shift of lost production and could require up to a day of lost production, the change of the "selector pin" according to the current Example would take 15-30 minutes in a typical production environment and could be accomplished during the time required to make the material change.

Referring to Tables 1 and 2 below, the encapsulated edges provide a significant increase in output and line speed as compared to existing processes/methods. By combining the edge encapsulation with controlled melt temperature and/or reduced die lip gap the output and line speed can be further increased. The PLA referenced in Tables 1 and 2 below is Ingeo 1102.

TABLE 1

| SCREW DESIGN | LDPE Output (KgPH)/ Temp ° C. | OUTPUT AT 75 RPM PLA | |
|---|---|---|---|
| | | Output (KgPH)/ Temp ° C. | % increase over typical screw design |
| Single Flight Double Mixer Typical Extrusion Coating Design | 50/324 | 78/252 | |
| Melt Barrier Flight Single Mixer Moderate Shear Design Compromise Extrusion Coating Design | 66/314 | 107/253 | 137% |
| Melt Barrier Flight Single Mixer Low Shear Design Specialty Extrusion Coating Design | 64/304 | 119/249 | 153% |

TABLE 2

| SCREW DESIGN | LINE SPEED PLA | | |
|---|---|---|---|
| | % increase over typical screw design | % increase when reducing die lip gap | % increase with encapsulated edge and no change in die lip gap |
| Single Flight Double Mixer Typical Extrusion Coating Design | | 130% | |
| Melt Barrier Flight Single Mixer Moderate Shear Design Compromise Extrusion Coating Design | 131% | | |
| Melt Barrier Flight Single Mixer Low Shear Design Specialty Extrusion Coating Design | 143% | 186% | 202% |

Figure 12A:
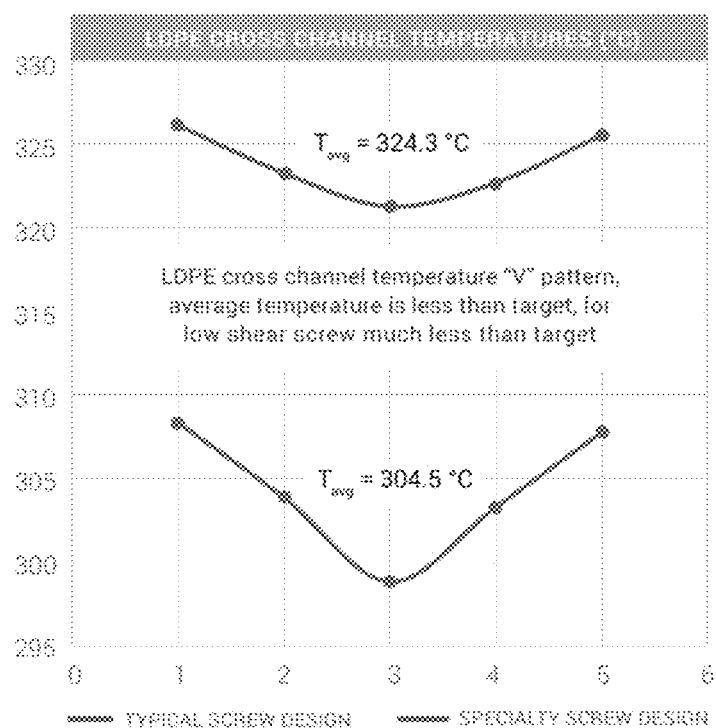
FIGS. 12A-B show graphs illustrating cross channel temperatures of (A) LDPE and (B) PLA.
Figure 12B:
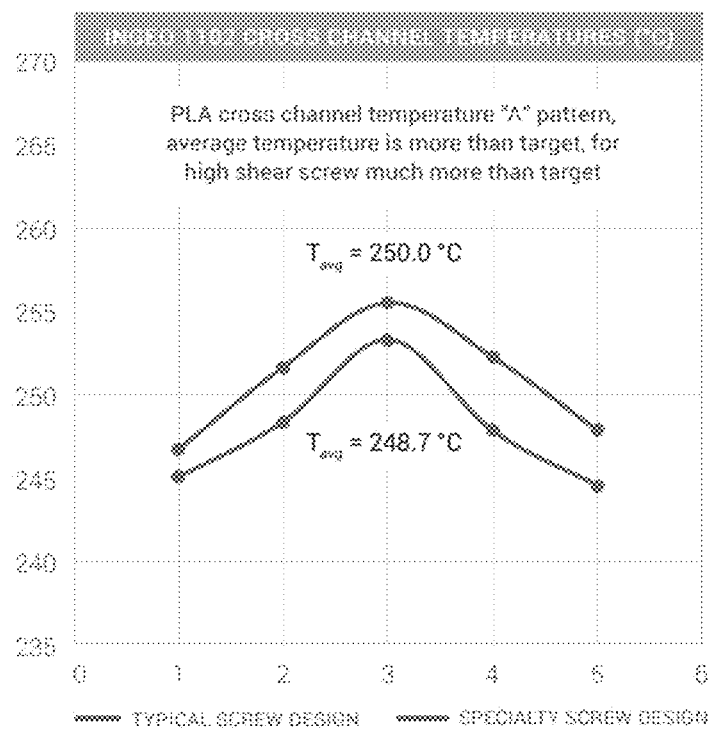

Additionally, as shown in FIGS. 12A-B, what is good for a low viscosity thermally stable polymer (LDPE) is not good for a high viscosity thermally sensitive polymer (PLA). Furthermore, measuring melt temperature only at channel edge does not accurately reflect mid-channel melt temperature, where the true melt temperature is likely hitter than edge measurements indicate. In view thereof, differing melt temperature profiles may be used to design changes that increase extruder output at acceptable temperatures.

Example 2

Figures 13A, 13B:
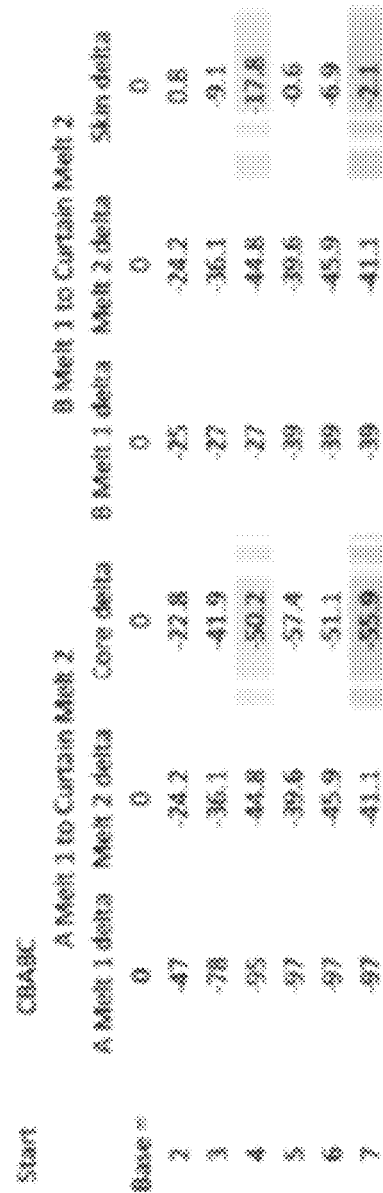
FIGS. 13A-B show tables illustrating data from multiple runs with LDPE. (A) Run data. (B) Temperature Comparisons.
Figures 14A, 14B:
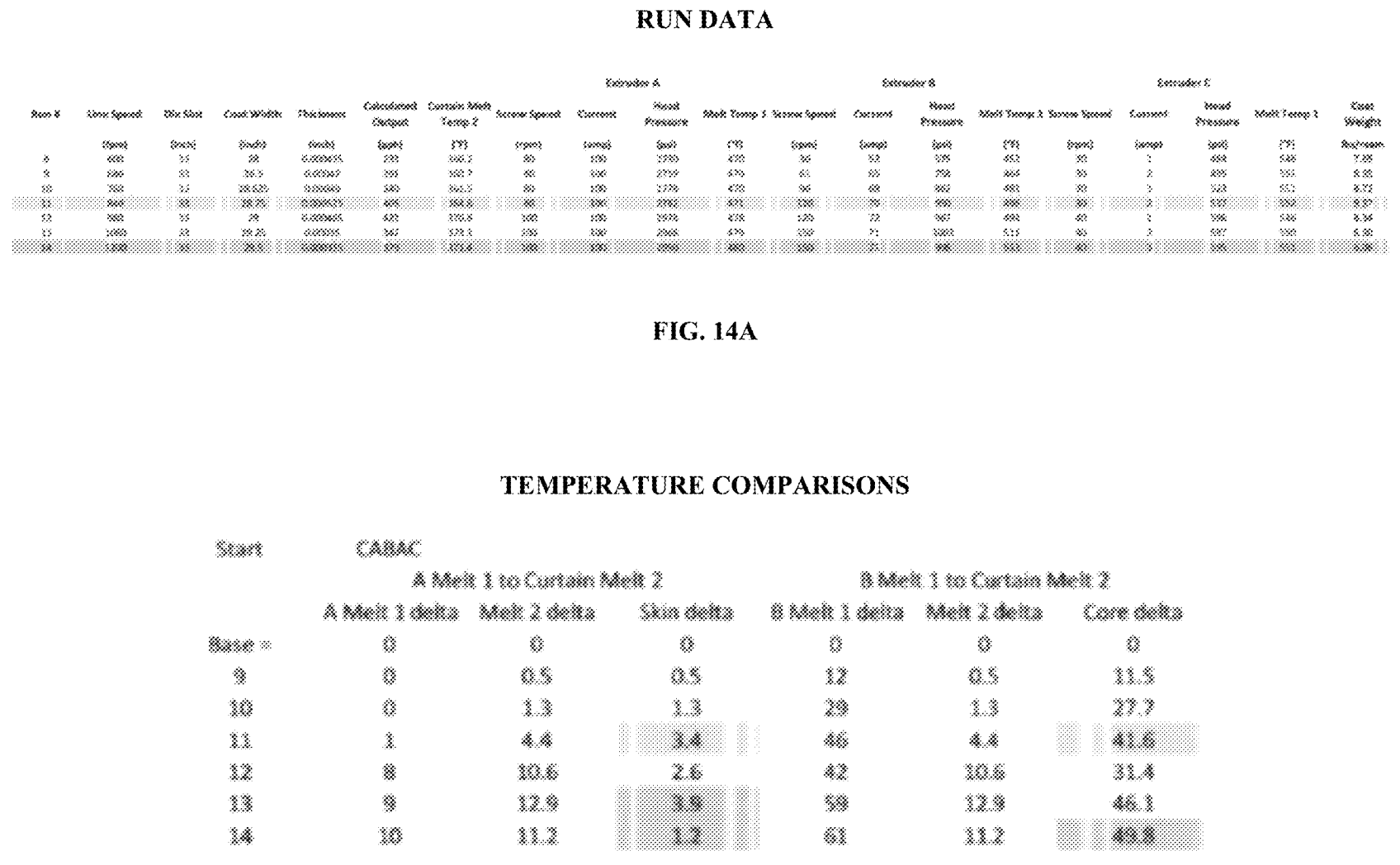

This Example describes the results of a trial switching from LDPE to PLA with only a selector plug change. The trial consisted of two phases. Phase 1 included multiple runs with LDPE. Phase 2 included multiple runs with PLA. The results of Phase 1 are shown in FIGS. 13A-B, and the results of Phase 2 are shown in FIGS. 14A-B.

In each phase the general arrangement was as follows:

| Extruder Screws |
|---|
| A - Low Shear Barrier Screw |
| B - Moderate Sheet GP Screw |
| C - Moderate Shear Barrier Screw |
| Die Lip Gap - 0.020"/0.5 mm |
| Air Gap - 7.0"/1.75 mm |
| Melt Temperature 1 - Exposed Junction Melt Probe @ Center of Melt Flow Before Feedblock |
| Melt Temperature 2 - Raytek MP150 @ 5.0"/125 mm below die lips |

In Phase 1, the set-up was as follows:

| Set-Up |
|---|
| Feedblock Selector Plug - CBABC |
| A - Material, Chevron 4517 5.1 MI 0.923 gm/cc Density |
| Extruder A Barrel Profile (° F.) - 400/500/620/620/620/620 A Downstream - 610 Feedblock - 610 Die - 600 |
| Extruder A Barrel Profile (° C.) - 204/260/326/326/326/326 A Downstream - 321 Feedblock - 321 Die - 316 |
| B - Material, Chevron 4517 5.1 MI 0.923 gm/cc Density |
| Extruder B Barrel Profile (° F.) - 450/550/650/640/640/640 A Downstream - 610 Feedblock - 610 Die - 600 |
| Extruder B Barrel Profile (° C.) - 232/288/343/338/338/338 A Downstream - 321 Feedblock - 321 Die - 316 |
| B - Material, Chevron 4517 5.1 MI 0.923 gm/cc Density |
| Extruder C Barrel Profile (° F.) - 380/480/590/590/600 A Downstream - 660 Feedblock - 610 Die - 600 |
| Extruder C Barrel Profile (° C.) - 193/249/310/313/316 A Downstream - 316 Feedblock - 321 Die - 316 |

In Phase 2, the set-up was as follows:

| Set-Up |
|---|
| Feedblock Selector Plug - CABAC |
| A - Material, Natureworks Ingeo 1102 5.4 MI 1.23 gm/cc Density |
| Extruder A Barrel Profile (° F.) - 370/410/445/455/450/445 A Downstream & Feedblock & Die - 445 |
| Extruder A Barrel Profile (° C.) - 188/210/229/235/232/229 A Downstream & Feedblock & Die - 229 |
| B - Material, Natureworks Ingeo 1102 5.4 MI 1.23 gm/cc Density |
| Extruder B Barrel Profile (° F.) - 370/410/445/455/450/445 A Downstream & Feedblock & Die - 445 |
| Extruder B Barrel Profile (° C.) - 188/210/229/235/232/229 A Downstream & Feedblock & Die - 229 |
| B - Material, Chevron 4517 5.1 MI 0.923 gm/cc Density |
| Extruder C Barrel Profile (° F.) - 380/450/520/550/550 A Downstream - 550 Feedblock - 445 Die - 445 |
| Extruder C Barrel Profile (° C.) - 193/232/271/287/287 A Downstream - 287 Feedblock - 229 Die - 229 |

All publications, patents, and patent applications mentioned in this specification are herein incorporated by reference to the same extent as if each individual publication, patent, or patent application was specifically and individually indicated to be incorporated by reference.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

What is claimed is:

1. An extruder system for rapid change between different melt strength polymers, the system comprising:
   at least three polymer extruders;
   a flow spool; and
   a multilayer feedblock including:
   a first combining zone;
   a second combining zone; and
   at least one cartridge insert arrangement in each of the first combining zone and the second combining zone;
   wherein each cartridge insert arrangement is configured to receive a cartridge insert, the cartridge insert directing flow of a polymer from one of the polymer extruders.

2. The extruder system of claim 1, wherein each of the cartridge inserts is independently selected from the group consisting of a vane insert and an encapsulation insert.

3. The extruder system of claim 2, wherein each cartridge insert arrangement in the first combining zone includes a vane insert positioned therein.

4. The extruder system of claim 2, wherein each cartridge insert arrangement in the second combining zone includes a vane insert.

5. The extruder system of claim 2, wherein each cartridge insert arrangement in the second combining zone includes an encapsulation insert.

6. The extruder system of claim 1, wherein the first combining zone includes at least three flow channels, each flow channel receiving polymer flow from one or more of the at least three polymer extruders.

7. The extruder system of claim 6, wherein the second combining zone includes:
   a center flow channel; and
   at least two outer flow channels;
   wherein the center flow channel receives polymer flow from the first combining zone; and
   wherein the at least two outer flow channels receive polymer flow from one or more of the at least three polymer extruders.

8. The extruder system of claim 7, wherein each of the outer flow channels is directed through one of the cartridge inserts.

9. The extruder system of claim 8, wherein each of the cartridge inserts is a vane insert and the extruder system forms stacked polymer flows.

10. The extruder system of claim 8, wherein each of the cartridge inserts is an encapsulation insert and the extruder system form encapsulated edge flows.

11. A method of forming an encapsulated coating with the extruder system of claim 1, the method comprising:
    extruding a first polymer through a first extruder;
    extruding a second polymer through a second extruder;
    extruding a third polymer through a third extruder;
    forming a full width core layer from the first polymer;
    passing the second polymer through vane inserts in the first combining zone to form two full width outer layers;
    combining the full width core layer with the two full width outer layers in the first combining zone to form a central portion;
    passing the third polymer through edge encapsulation inserts in the second combining zone to form edge encapsulation layers; and
    combining the central portion with the edge encapsulation layers in the second combining zone to form the encapsulated coating.

12. The method of claim 11, wherein the third polymer is a high melt strength polymer.

13. The method of claim 12, wherein the high melt strength edge encapsulation layers provide increased production speeds.

14. The method of claim 12, wherein:
    the coating is a conventional extrusion coating;
    the first polymer is extruded from an extruder configured for low shear and low temperature processing (LT-E);
    the second polymer is extruded from an extruder configured for higher shear and high temperature processing (HT-E);
    the third polymer is extruded from an extruder configured for edge encapsulation (EE-E); and
    the second polymer extruded from the HT-E extruder forms a hot skin layer that provides an improved oxidation bond.

15. The method of claim 14, wherein the first polymer is an extrusion coating grade low density polyethylene (LDPE), the second polymer is an extrusion coating grade LDPE, and the third polymer is a high melt strength autoclave LDPE.

16. The method of claim 12, wherein:
    the coating is a bio-based or bio-degradable extrusion coating;

the first polymer is extruded from an extruder configured for higher shear and high temperature processing (HT-E);

the second polymer is extruded from an extruder configured for low shear and low temperature processing (LT-E);

the third polymer is extruded from an extruder configured for edge encapsulation (EE-E); and the second polymer extruded from the LT-E extruder forms a cold skin layer that provides an improved melt strength in processing.

17. The method of claim 16, wherein the high melt strength polymer is low density polyethylene.

18. The method of claim 16, wherein the first polymer is a bio-based bio-degradable polymer, the second polymer is a bio-based bio-degradable polymer, and the third polymer is a high melt strength autoclave LDPE.

19. The method of claim 18, wherein the first polymer and the second polymer are PLA.

* * * * *